Figure 1:
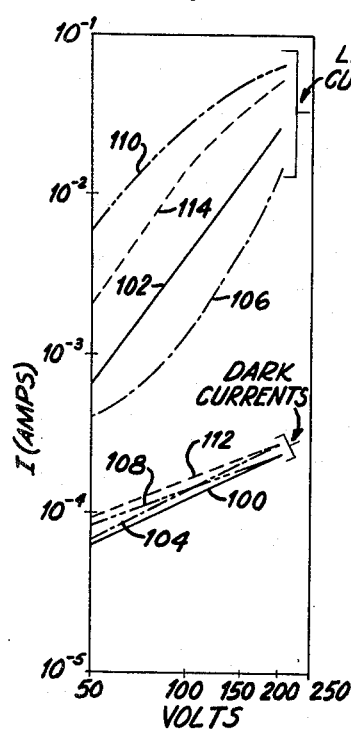

Feb. 23, 1965    G. H. MORRISON ETAL    3,170,886
METHOD FOR TREATING PHOTOCONDUCTIVE CADMIUM SULFIDE CELL
Filed April 26, 1961

INVENTORS.
GEORGE H. MORRISON
FRANK PALILLA
WALTER ZLOCZOWER
BY ATTORNEY 3,170,886
METHOD FOR TREATING PHOTOCONDUCTIVE CADMIUM SULFIDE CELL
George H. Morrison, Westbury, Frank C. Palilla, Maspeth, and Walter Zloczower, Forest Hills, N.Y., assignors to General Telephone and Electronics, Inc., a corporation of Delaware
Filed Apr. 26, 1961, Ser. No. 105,770
1 Claim. (Cl. 252—501)

Our invention relates to photoconductive cells of cadmium sulfide type.

A typical cell of this type, as for example disclosed in U.S. Patent 2,937,353, comprises a photoconductive layer consisting of copper activated cadmium sulfide particles embedded in a glass enamel, and two electrodes secured to this layer in spaced apart positions. When a voltage is applied across this cell and the cell is in the dark, the impedance of the cell is extremely high, and a very low current, the dark current, flows through the cell. If the cell is then irradiated with incident light, the cell impedance drops to a low value, and a relatively high current, the light current (or photocurrent), flows through the cell. The ratio of the light current to the dark current [or the equivalent ratio of the dark impedance to the light impedance] under specified conditions defines the photosensitivity of the cell.

When suddenly illuminated, the cell requires a finite period of time, the rise time, before the current through the cell will rise from the initial dark value to 90% of the final light value. When the illumination is suddenly cut off, the cell requires another finite period of time, the decay time, before the current through the cell will drop 90% from the initial light value.

We have discovered new methods for processing cadmium sulfide photoconductive cells of the type described in which the rise and decay times can be modified in a predetermined manner. Moreover, we have found that our methods can be used to increase the photosensitivity of the cell.

Accordingly it is an object of our invention to increase the photosensitivity of photoconductive cells of the type indicated.

Another object is to modify the rise and decay times of photoconductive cells of the type indicated.

Still another object is to decrease the decay time of the photoconductive cells of the type indicated.

In accordance with the principles of our invention, a photoconductive cell of the type indicated was heated to a temperature falling within the range of 500°–800° C. and then was allowed to cool to room temperature.

When the cell was cooled relatively rapidly, and the cooled cell was then tested, we found that the photosensitivity of the cell treated was sharply increased as compared to the photosensitivity of the untreated cell.

The first cooled cell was again heated to a temperature falling within the range of 500°–800° C. and then permitted to cool relatively slowly. When the slow-cooled cell was tested, we found that, while as compared to an untreated cell, photosensitivity of the slow-cooled cell decreased and the rise time of the slow-cooled cell increased, the decay time of the slow-cooled cell was significantly decreased.

Finally, the slow-cooled cell was again heated to a temperature falling within the range 500°–800° C. and then permitted to cool relatively rapidly to room temperature. As compared to the untreated cell, the photosensitivity and the rise time of the thrice fired cell increased, while the decay time of the thrice fired cell decreased.

Figure 3:
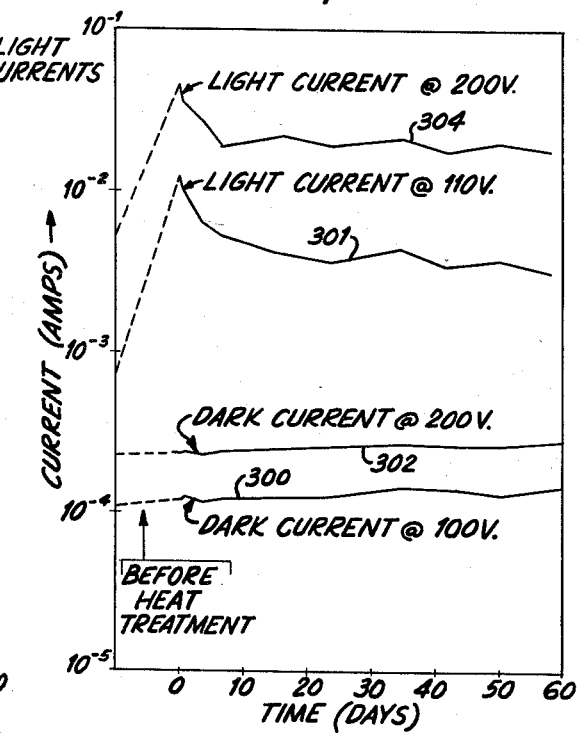
Figure 2:
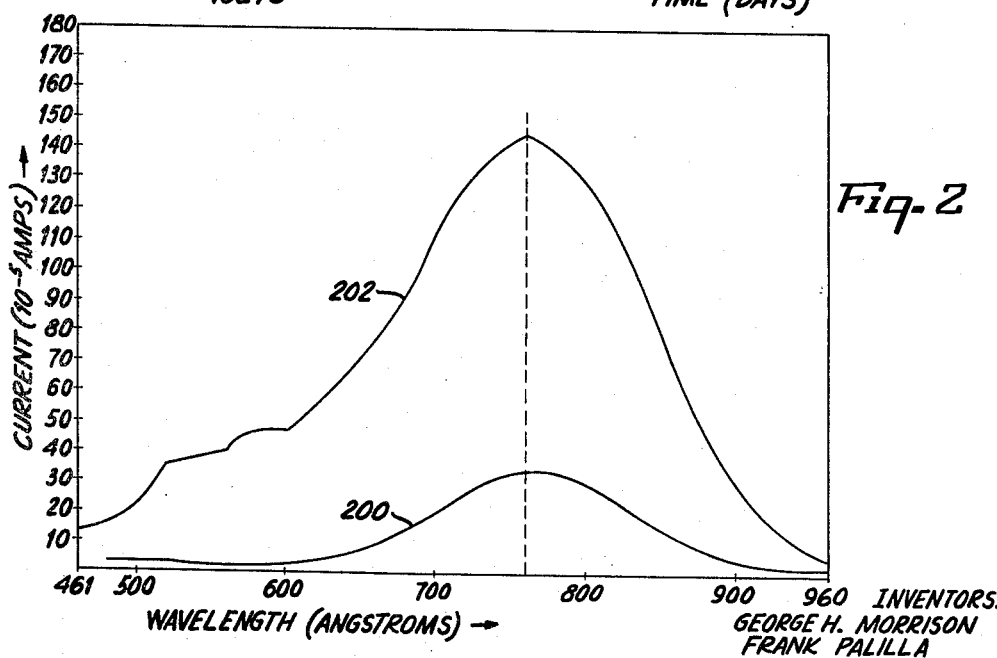

Illustrative embodiments of our invention will now be described both with reference to the examples which follow and to the accompanying drawings wherein:

FIG. 1 graphically illustrates dark current and photocurrent characteristics of untreated cells of the cadmium sulfide type; as compared to cells which have been subjected to various heat treatments in accordance with our invention;

FIG. 2 graphically illustrates the relationships between photocurrents and wavelengths of incident light for untreated and heat-treated cells of the cadmium sulfide type; and FIG. 3 graphically illustrates the stability of the dark currents and photocurrents of heat-treated cells as measured with respect to time.

*Example 1*

A photoconductive cell comprising a substrate supporting a photoconductive layer consisting of copper activated cadmium sulfide particles (containing .08% of weight of copper) embedded in a glass enamel and first and second electrodes secured to this layer at spaced apart positions was constructed in the manner set forth in U.S. Patent 2,937,352.

The cell was then tested in the following manner. An alternating voltage at a frequency of 1000 cycles per second was applied across the cell. With the cell in the dark, the voltage was varied in steps from 50 volts R.M.S. to 250 volts R.M.S. The resultant dark currents were plotted as curve 100 in FIG. 1.

The cell was then irradiated with 10 foot-candles of incandescent light, and the applied voltage was varied in the same steps as before. The resultant photocurrents were plotted as curve 102 in FIG. 1.

The cell was then fired in a muffle furnace in air at a temperature of 600° C. for four minutes and was then cooled rapidly to room temperature by removing the cell from the furnace.

This first-fired cell was then tested in the same manner as above. The resulting dark and photocurrents are shown in curves 112 and 114 in FIG. 1. As can be seen from a comparison of curves 100 and 102 with curves 112 and 114, both the dark currents and the photocurrents were increased as a result of this first firing step, but the photocurrent for example at 100 volts R.M.S. increased by a 3.5 while the dark current increased by a factor of about 1.3 with a consequent increase of photosensitivity by a factor of 2.7.

This first-fired cell was fired again in the furnace at a temperature of 500° C. for four minutes. The cell was then allowed to cool slowly in the furnace to room temperature (a period of about 3–5 hours).

The second-fired cell was then tested in the same manner as above. The resulting dark and photocurrents are shown in curves 104 and 106 of FIG. 1. It will be seen that the photocurrents actually were reduced to values below those of the unfired cell while the dark currents increased to values above those of the unfired cell. In other words, the photosensitivity of the second-fired cell was reduced not only below that of the first-fired cell but also below that of the unfired.

The second-fired cell was then fired again in the furnace at a temperature of 500° C. for a period of four minutes and then cooled rapidly to room temperature by removing the cell from the furnace. The thrice-fired cell was then tested in the same manner as above. The resulting dark and photocurrents are shown in curves 108 and 110. It will be seen that the photocurrents in curve 110 are substantially higher than the photocurrents obtained from any of the other treated or untreated cells while the dark currents of the thrice-fired cell are approximately the same as the dark currents of the untreated cell. As can be seen from a comparison at 100 volts of curves 108 and 110 with curves 100 and 102, the photosensitivity of the thrice-heated cell was increased by a factor as high as 5.6 as compared to the photosensitivity of the untreated cell.

*Example II*

A cell comprising a photoconductive layer consisting of copper activated cadmium sulfide particles containing 0.12% by weight of copper embedded in a glass enamel was prepared and electroded in the same manner as in Example I.

A direct voltage of 250 volts was applied across the cell. When the cell was initially in the dark and then suddenly exposed to 10 foot-candles of incandescent illumination, the rise time was found to be 370 milliseconds. With this illumination suddenly cut off, the decay time was measured and found to be 115 milliseconds.

The cell was then subjected to an initial firing as in Example I. When the first-fired cell was tested as above, the rise time was found to be 400 milliseconds and the decay time was found to be 100 milliseconds.

The first-fired cell was then fired a second time as in Example I. When the second-fired cell was tested, the rise time was found to be 3000 milliseconds and the decay time was found to be 36 milliseconds.

The second-fired cell was then subjected to a third firing step as in Example I. When the third-fired cell was tested, the rise time was found to be 1000 milliseconds and the decay time was found to be 75 milliseconds.

*Example III*

The wavelength response of the untreated cell of Example I was measured at an applied alternating voltage of 200 volts R.M.S. and 60 cycles per second frequency. The wavelength of the exciting light at constant energy was varied in steps from 460 angstroms to 960 angstroms and the photocurrent was measured at each step. The results are plotted as curve 200 in FIG. 2.

The wavelength response of the first-fired cell of Example I was measured in the same manner. The results are plotted as curve 202 in FIG. 2.

It can be seen from FIG. 2 that the increase in sensitivity is a result of an overall increase in photocurrents throughout the wavelength range, rather than a shift in the peak wavelength response of the photoconductor.

*Example IV*

A cell produced in the manner set forth in Example II was fired to 800° C. for four minutes in a muffle furnace and then was removed from the furnace to cool rapidly to room temperature.

FIG. 3 indicates the rise in light and dark currents after the heat treatment and the stability with time which was achieved. The voltage values indicated are R.M.S. values of 200 volts and 100 volts respectively at a frequency of 1000 cycles per second. The incident light was 10 foot-candles of incandescent illumination.

The ambient humidity was not controlled during this 60 day measurement period and was varied between 45% and 95% during this period.

What is claimed is:

A method for treating a photoconductive cadmium sulfide cell which comprises heating said cell in a furnace to a temperature falling within the range 500°–800° C. for a period of four minutes; removing said fired cell from the furnace and exposing the removed cell to ambient conditions until said cell is cooled to room temperature; reheating said cell in a furnace to a temperature within said range for said firing period; permitting said furnace containing said reheated cell to cool to room temperature; again reheating said cell in a furnace to a temperature within said range for said firing period; and removing said again reheated cell from the furnace and exposing the again reheated cell to ambient conditions until the again reheated cell is cooled to room temperature.

References Cited by the Examiner
UNITED STATES PATENTS 2,930,999  3/60  Van Santen et al. -------- 252—501
2,986,534  5/61  Beutler ---------------- 252—501

JULIUS GREENWALD, *Primary Examiner.*
JOSEPH R. LIBERMAN, *Examiner.*